United States Patent
Roffet

(10) Patent No.: US 9,582,861 B2
(45) Date of Patent: Feb. 28, 2017

(54) IMAGE PROCESSING TECHNIQUE USING HIGH FREQUENCY DATA ANALYSIS TO FILTER LOW FREQUENCY DATA BY DYNAMIC KERNEL ADJUSTMENT

(71) Applicant: STMicroelectronics (Grenoble 2) SAS, Grenoble (FR)

(72) Inventor: Gregory Roffet, Coublevie (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 81 days.

(21) Appl. No.: 14/683,368

(22) Filed: Apr. 10, 2015

(65) Prior Publication Data
US 2016/0300330 A1    Oct. 13, 2016

(51) Int. Cl.
  *G06T 5/00* (2006.01)
  *G06T 5/10* (2006.01)

(52) U.S. Cl.
  CPC .............. *G06T 5/003* (2013.01); *G06T 5/10* (2013.01); *G06T 2207/10024* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,317,427 A * | 5/1994 | Ichikawa | ................ | G06T 5/007 358/465 |
| 8,223,219 B2 * | 7/2012 | Hatano | ................. | H04N 1/393 348/222.1 |
| 8,411,939 B2 * | 4/2013 | Roffet | ....................... | G06T 5/20 348/242 |
| 8,427,560 B2 * | 4/2013 | Horie | ..................... | H04N 9/045 348/222.1 |
| 8,811,741 B2 | 8/2014 | Roffet | | |
| 8,903,189 B2 | 12/2014 | Roffet | | |
| 8,917,336 B2 * | 12/2014 | Cote | ....................... | H04N 9/64 348/241 |
| 2004/0190023 A1 * | 9/2004 | Aoyama | .................. | H04N 1/58 358/1.9 |
| 2009/0040386 A1 * | 2/2009 | Ishiga | ....................... | G06T 5/10 348/607 |
| 2013/0016905 A1 * | 1/2013 | Park | ...................... | H04N 9/646 382/167 |
| 2014/0086507 A1 * | 3/2014 | Lin | ......................... | G06T 5/007 382/274 |

* cited by examiner

*Primary Examiner* — Anand Bhatnagar
(74) *Attorney, Agent, or Firm* — Gardere Wynne Sewell LLP

(57) ABSTRACT

A method includes separating image data into high frequency image data and low frequency image data. The high frequency image data is separated into windows, with each window containing pixels. The low frequency image data is separated into windows corresponding respectively to the plurality of windows of the high frequency image data, with each window containing pixels. For each window in the high frequency image data, a number of textured pixels in the window is determined, the textured pixels being pixels that vary greatly in luminance value with respect to other pixels in the window, and a window modification is determined such that the number of textured pixels in the window is reduced. For each corresponding window in the low frequency image data, the window modification is applied, and each textured pixel in the window is corrected based upon the other pixels in the window.

21 Claims, 3 Drawing Sheets

IMAGE PROCESSING TECHNIQUE USING HIGH FREQUENCY DATA ANALYSIS TO FILTER LOW FREQUENCY DATA BY DYNAMIC KERNEL ADJUSTMENT

TECHNICAL FIELD

This disclosure relates to the field of digital image processing, and more particularly, to the usage of high frequency information to filter low frequency data from an image so as to produce a clear picture.

BACKGROUND

Digital photography is popular and widespread in the world today. In addition to the numerous models and types of standalone digital cameras for sale on the consumer market, most cellular telephones and tablets have a digital camera integrated therein. In fact, digital photography is so popular that smart-watches that include a digital camera integrated therein are even on the market.

With the popularity of digital photography, there is a consumer desire and thus a commercial need for digital cameras, both standalone and incorporated into other electronic devices, that take sharp, high quality pictures that are pleasing to the consumer. That equates to a commercial need for advanced image processing techniques capable of delivering those sharp, high quality pictures even when the conditions under which said pictures are taken are not ideal.

The small size of image sensors and lenses used in cameras for smartphones, tablets, and smart-watches may result in misinterpretation of pixel data during image capture, ultimately leading to erroneous color reproduction and a lack of clarity in portions of an image where dark colored areas border light colored areas. Therefore, image processing techniques that correct this color reproduction and lack of clarity are desired.

SUMMARY

In accordance with the present disclosure, a method includes separating image data into high frequency image data and low frequency image data, using a processor. Each item of data may be pixel values or intensity values. The high frequency image data is separated into a plurality of windows, with each window containing pixels of a certain values, using the processor. The low frequency image data is separated into a plurality of windows corresponding respectively to the plurality of windows of the high frequency image data, with each window containing pixels of certain values, using the processor. For each window of the plurality thereof in the high frequency image data, the processor is used to determine a number of textured pixels in the window, the textured pixels being pixels that vary greatly in luminance value with respect to other pixels in the window, and determine a window modification such that the number of textured pixels in the window is taken into account. For each corresponding window of the plurality thereof in the low frequency image data, the processor is used to apply the window modification to adapt the processing from a high frequency data analysis in the corresponding window based upon the other pixels in the low frequency window.

Applying the window modification may include reducing a size of the window of the low frequency image data such that the number of pixels and/or their intensities in the window is reduced, removing at least one pixel (considered as a faulty pixel) in the window of the low frequency image data such that the number of pixels and/or their intensities in the window is reduced, generating a plurality of sub-windows inside the window, and/or removing at least one sub-window of the low frequency image data such that the number of pixels and/or their intensities in the remaining sub-windows of the window is reduced.

Applying the window of the low frequency image data modification may include applying a weight to each pixel in the window, with some weights being zero. Each considered pixel in the window defined from the high frequency data influences a corresponding weight for the pixel value of the low frequency data. The image data may be encoded in a YUV format in which the Y component of the image data represents luminance information and U and V components represent chrominance information. The high frequency image data may be represented by the Y component, and the low frequency image data may be represented by the U and V components.

Separating the low frequency image data into a plurality of windows may include separating the low frequency image data into higher range low frequency image data and lower range low frequency image, and the window modification may be applied to windows of the higher range low frequency image data and at the end of a multi frequency image data decomposition. The pixels of each window may be arranged in a square shape. The window modification may be based upon the number of textured pixels in the window.

Another aspect is directed to a method including separating image data into high frequency image data and low frequency image data using a processor, with the image data being encoded in a YUV format in which the Y component of the image data represents luminance information and U and V components represent chrominance information, the high frequency image data being represented by the Y component, and the low frequency image data being represented by the U and V components. The high frequency image data may be separated into a plurality of windows, with each window containing pixels, using the processor. The low frequency image data may be separated into a plurality of windows corresponding respectively to the plurality of windows of the high frequency image data, with each window containing pixels, using the processor. A number of textured/selective pixels in each window may be identified using the processor, the textured pixels being pixels that vary greatly in luminance value with respect to other pixels in that window. The number of textured pixels in each window of the low-frequency image data may be reduced by analyzing a corresponding window of the high-frequency image data and weighting the pixels of the window of the low-frequency image data based thereupon, using the processor.

A further aspect is directed to a device having an image sensor configured to capture image data, and a processor. The processor is configured to receive image data, separate the image data into high frequency image data and low frequency image data, and separate the high frequency image data into a plurality of windows, with each window containing pixels. The processor is also configured to separate the low frequency image data into a plurality of windows corresponding respectively to the plurality of windows of the high frequency image data, with each window containing pixels. For each window of the plurality thereof in the high frequency image data, the processor is configured to determine a number of textured pixels in the window, the textured pixels being pixels that vary greatly in luminance value with respect to other pixels in the window, and determine a window modification such that the number of textured pixels in the window is reduced. For each corresponding window of the plurality thereof in the low frequency image data, the processor is configured to apply the window modification, and correct each pixel in the window based upon the other pixels in the window so as to produce corrected low frequency image data. The processor is further configured to combine the high frequency image data and the corrected low frequency image data to produce corrected image data.

A further aspect is directed to a method including receiving image data comprising high frequency image data and low frequency image data, wherein the image data is encoded in a YUV format in which the Y component of the image data represents luminance information and the U and V components represent chrominance information. The high frequency image data is represented by the Y component, and the low frequency image data is represented by the U and V components. Corresponding textured/specific pixels of the low frequency image data are not taken into account based upon analysis of the high frequency image data. The textured pixels are pixels that vary greatly in luminance value with respect to nearby pixels.

DETAILED DESCRIPTION

One or more embodiments will be described below. These described embodiments are only examples of implementation techniques, as defined solely by the attached claims. Additionally, in an effort to provide a focused description, irrelevant features of an actual implementation may not be described in the specification.

Figure 1:
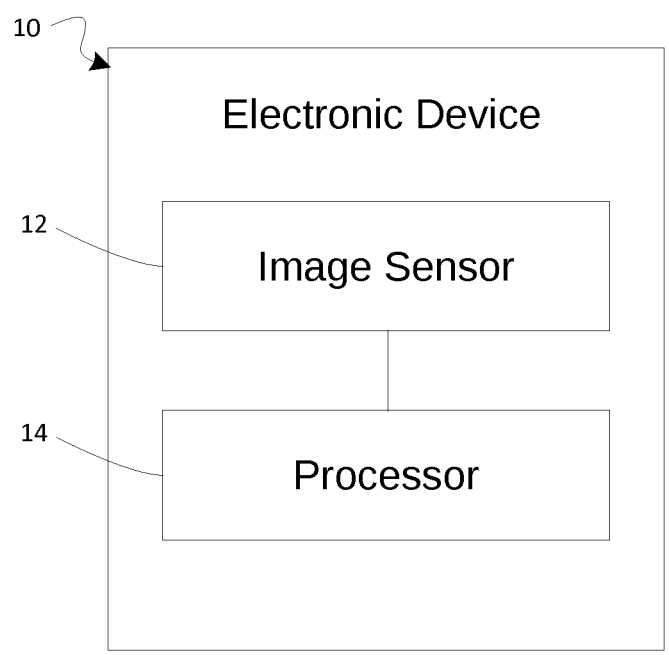
FIG. 1 is a block diagram of an electronic device on which the image processing methods of this disclosure can be performed.

Image processing techniques will be described herein, however first an electronic device 10 which can be used to perform such image processing techniques will now be described with reference to FIG. 1. The electronic device 10 can be a consumer product, such as a smartphone, tablet, point and shoot digital camera, or SLR digital camera. The electronic device 10 includes an image sensor 12 for capturing image data, and a processor 14 for applying the image processing techniques to the image data. Although the electronic device 10 is shown as including the image sensor 12, it is to be understood that the image sensor 12 is optional and that the electronic device 10 may be a device such as a high definition television or projector.

Figure 2:
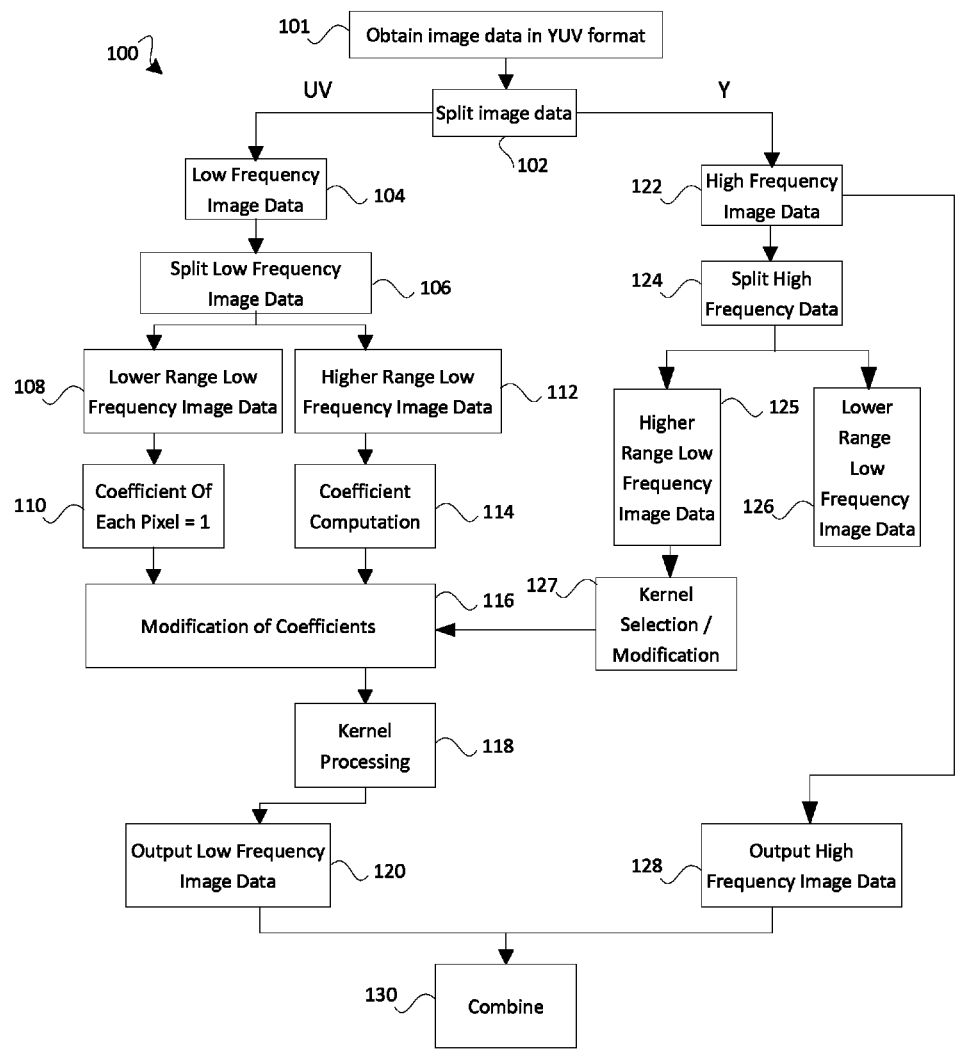
FIG. 2 is a flow chart of an image processing method in accordance with this disclosure.

With additional reference to the flowchart 100 of FIG. 2, the image processing method is now described. First, image data in the YUV color space is obtained (Block 101) by the processor 14. The image data may be obtained by the image sensor 12 should the electronic device 10 include one, but may come from any source (i.e. data storage, a streaming data source over a network, etc). The image data may be in the YUV color space, although in some applications the image data may be in the RGB color space, or even in a Bayer pattern, in which case it is converted to the YUV color space by the processor 14 before the image processing continues. This can be in the YUV color space but generally split in luminance and chrominance information.

The RGB color space is one in which each pixel of image data is comprised of red, green, and blue components, which, when combined, reproduce the original colors of the image. Differently, the YUV color space is one in which each pixel of image data is comprised of a luminance component Y, and two chrominance components U, V. The luminance represents the brightness of that pixel, while the chrominance represents the color of that pixel. Those skilled in the art will be well versed in RGB and YUV color spaces, and understand how to convert image data from the RGB color space to the YUV color space.

Image data where sharp transitions between colors and/or brightness levels may often lead to color bleed and other errors which degrade the accuracy and sharpness of the resulting image. These errors can be linked to the processing applied being unable to detect edges or textured information on low frequency data. This color bleed or other errors are due to limitations of the image sensor 12 technology, and manifest in the form of "textured" pixels, which are pixels that vary greatly in value from surrounding pixels. The inventors have found a new processing able to limit the color bleed or other errors. Therefore, with the image data in YUV format, the image data is split into the luminance component Y and the chrominance components UV, which represent the high frequency image data and low frequency image data, respectively, by the processor 14 (Block 102).

The low frequency image data and high frequency image data are processed differently, and ultimately recombined to produce corrected image data. In particular, in addition to standard processing, the high frequency image data is analyzed, and the data from that analysis is used to perform corrections on the low frequency image data.

The low frequency image data processing will now be described. Starting with the low frequency image data (Block 104), the low frequency image data is split yet again (Block 106) by the processor 14 into lower range low frequency image data (Block 108) and higher range low frequency image data (Block 112). The splitting of the lower range low frequency image data (Block 106) and the higher range low frequency image data may be performed using techniques described in U.S. Pat. No. 8,903,189 and in U.S. Pat. No. 8,811,741, the contents of both which are hereby incorporated by reference in their entirety.

The lower range low frequency image data is then used with considered windows to be processed based upon the average value of pixels of the lower range low frequency image data.

The windows of the lower range low frequency image data is processed via known techniques (Block 110) by the processor 14 where the weight of each pixel is identical. The pixels of the windows of the higher range low frequency image data are assigned coefficients used as weights by the processor 14 using known techniques (Block 114).

These coefficients are then modified if needed by the processor 14 based upon analysis of the high frequency image data (Block 116) such that some pixels will be assigned a weight of 0, as will be described in detail below. The coefficients, as modified, are then applied by the processor 14 to the higher range low frequency image data which results in the removal of certain pixels, which are then replaced by a weighted average of the pixel values around the removed pixels (Block 118). The now corrected low frequency image data is then output (Block 120).

The High frequency image data processing will now be described. Starting with the high frequency image data (Block 122), the high frequency image data is split yet again (Block 124) by the processor 14 into lower range high frequency image data (Block 126) and higher range high frequency image data (Block 125). The splitting of the lower range high frequency image data (Block 124) and the higher range high frequency image data (Block 126) may be performed using techniques described in U.S. Pat. No. 8,903,189 and in U.S. Pat. No. 8,811,741, the contents of both which are hereby incorporated by reference in their entirety.

Figure 3:
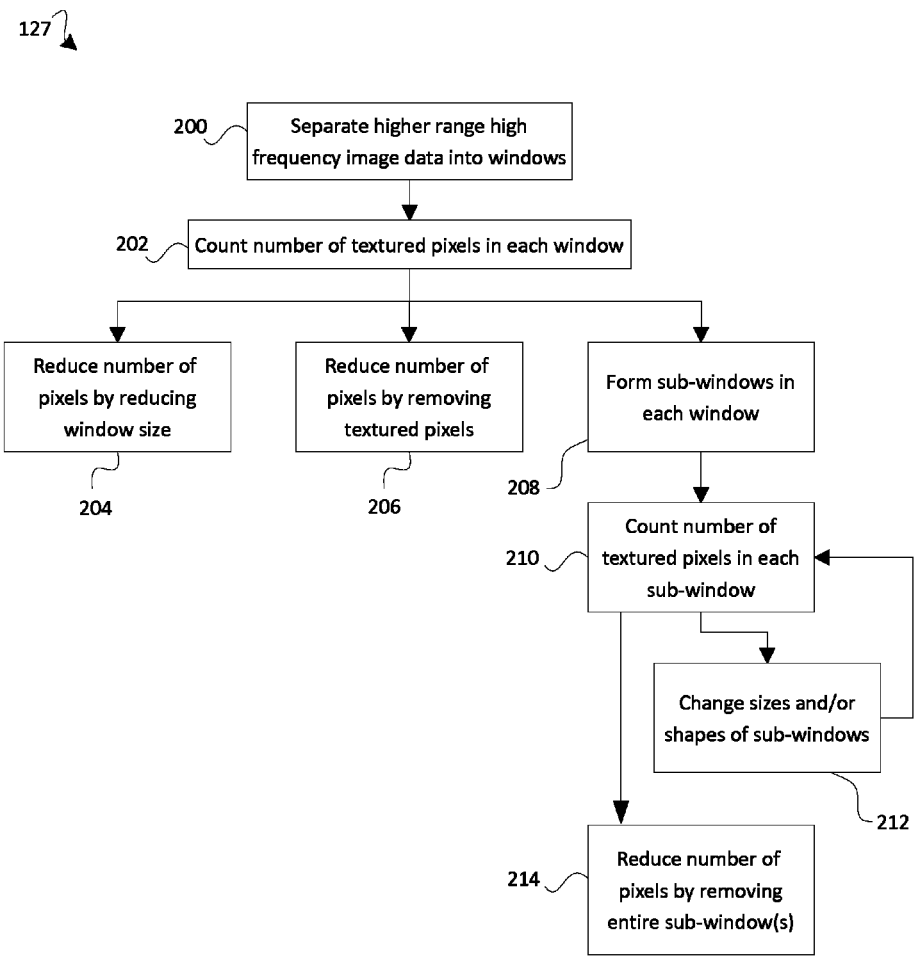
FIG. 3 is a detailed flow chart of the kernel selection and modification step of the image processing method of FIG. 2.

Then, a kernel selection/modification step (Block 127) is performed. With additional reference to FIG. 3, the kernel selection/modification step first involves the separation of the higher range high frequency image data into a windows (Block 200). These windows may take any size or shape, although the shapes are generally rectangular and the sizes are generally on the order of tens of pixels by tens of pixels (i.e. square windows of 11 pixels by 11 pixels).

Then, one of three further processing techniques is performed to reduce the influence of a number of textured pixels in the window of the higher range or lower range of the low frequency image data, depending on certain factors such as the processing power of the processor 14, and the quickness of processing desired.

The quickest and least processor intensive technique is to simply reduce the size of the window (Block 204). As an example, if the window was initially an 11×11 window, it could be reduced to a 9×9 pixel window, with the extraneous pixels designated to be discarded. Thus, reducing the size of the window does not mean the reduction of the size of other windows, just the size of window currently being processed, with the designation of the pixels left out to be discarded. The window need not be reduced in a symmetric pattern. For example, an 11×11 window centered on the central pixel could be reduced to a 9×9 window centered on the same central pixel positioned such that one pixel on the ring will be discarded while others pixels are to be kept. The determination of what dimensions to reduce the window to is made based upon the reduction of the number of textured pixels vs. the reduction of the number of non-textured pixels. This technique is perhaps best used for image processing in smartphones, tablets, and point and shoot cameras where processing power may be limited.

The next quickest and next least processor intensive technique is to identify the textured pixels and designate them for removal (Block 206). Since individual, spaced apart pixels are designated to be discarded as opposed to swaths of adjacent pixels, the processing power used for this technique is greater than the technique described above. This technique is perhaps best used for image processing in SLR cameras and lower end high definition televisions and projectors, which typically have more processing power relative to manipulating image data than smartphones, tablets, and point and shoot cameras.

The slower and more processor intensive technique starts with forming sub-windows in each window (Block 208). These sub-windows can be overlapping or non-overlapping. The number of textured pixels in each sub-window is counted (Block 210). If the number of textured pixels removed vs. number of non-textured pixels removed by removing a given sub-window would be favorable, the pixels of that sub-window are designated to be discarded (Block 214). If these calculations do not result in the identification of favorable sub-windows for discarding, then the sizes and/or shapes of the sub-windows are changed (Block 212), and the number of textured pixels in each sub-window is counted again (Block 210). This repeats until a desired number of textured pixels have been designated for discarding, or until a desired ratio of textured pixels vs. non-textured pixels have been designated for discarding. Due to the iterative nature of this technique, it is slower to perform and more processor intensive than the above described techniques. This technique is perhaps best used for image processing in professional grade SLR cameras and in high end high definition televisions and projectors, which possess a large amount of processing power.

Referring back to FIG. 2, regardless of which of the above three techniques is used for the kernel selection/modification step (Block 126), as stated above, the coefficients of the pixels to be discarded are set to 0 such that at the kernel processing step (Block 118), those pixels are discarded. Thus, data obtained by analyzing a window of high frequency image data is used to correct a corresponding window of low frequency image data.

The high frequency image data itself is unaltered, and is output (Block 128) by the processor 14 which next combines the low frequency image data and high frequency image data (Block 130) so as to produce the corrected image data. The corrected image data (Block 130) may in some applications be ready for presentation to a user in the form of an image or video, or may be further processed by other techniques.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
    separating image data into high frequency image data and low frequency image data, using a processor;
    separating the high frequency image data into a plurality of windows, with each window containing pixels, using the processor;
    separating the low frequency image data into a plurality of windows corresponding respectively to the plurality of windows of the high frequency image data, with each window containing pixels, using the processor;
    for each window of the plurality thereof in the high frequency image data, using the processor to:
        determine a number of textured pixels in the window, the textured pixels being pixels that vary greatly in luminance value with respect to other pixels in the window, and
        determine a window modification such that the number of textured pixels in the window is reduced; and
    for each corresponding window of the plurality thereof in the low frequency image data, using the processor to:
        apply the window modification, and
        correct each textured pixel in the window based upon the other pixels in the window.

2. The method of claim 1, wherein applying the window modification comprises reducing a size of the window such that the number of textured pixels in the window is reduced.

3. The method of claim 1, wherein applying the window modification comprises removing at least one textured pixel in the window such that the number of textured pixels in the window is reduced.

4. The method of claim 1, wherein applying the window modification comprises generating a plurality of sub-windows inside the window, and removing at least one sub-window such that the number of textured pixels in the remaining sub-windows of the window is reduced.

5. The method of claim 1, wherein applying the window modification comprises applying a weight to each pixel in the window, with some weights being zero.

6. The method of claim 1, wherein applying the window modification comprises applying a weight to each pixel in the window, with some weights being a defined value based on an analysis.

7. The method of claim 1, wherein each textured pixel in the window is corrected by setting a pixel value of the textured pixel to an average of each other pixel in the window.

8. The method of claim 1, wherein the image data is encoded in a YUV format in which a Y component of the image data represents luminance information and U and V components represent chrominance information; wherein the high frequency image data is represented by the Y component, and with the low frequency image data being represented by the U and V components.

9. The method of claim 1, wherein separating the low frequency image data into a plurality of windows comprises separating the low frequency image data into higher range low frequency image data and lower range low frequency image; and wherein the window modification is applied to windows of the higher range low frequency image data.

10. The method of claim 1, wherein the pixels of each window are arranged in a square shape.

11. The method of claim 1, wherein the window modification is based upon the number of textured pixels in the window.

12. The method of claim 11, wherein weighting the pixels of the window of the low-frequency image data produces corrected low-frequency image data; and further comprising combining the corrected low-frequency image data and the high-frequency image data so as to produce corrected image data.

13. The method of claim 11, wherein separating the low frequency image data into a plurality of windows comprises separating the low frequency image data into a plurality of windows of higher range low frequency image data and a plurality of windows of lower range low frequency image data; and wherein reducing the number of textured pixels in each window of the low-frequency image data comprises reducing the number of textured pixels in each window of the higher range low frequency image data.

14. A method, comprising:
separating image data into high frequency image data and low frequency image data using a processor, the image data being encoded in a YUV format in which a Y component of the image data represents luminance information and U and V components represent chrominance information, the high frequency image data being represented by the Y component, and the low frequency image data being represented by the U and V components;
separating the high frequency image data into a plurality of windows, with each window containing pixels, using the processor;
separating the low frequency image data into a plurality of windows corresponding respectively to the plurality of windows of the high frequency image data, with each window containing pixels, using the processor;
identifying a number of textured pixels in each window, the textured pixels being pixels that vary greatly in luminance value with respect to other pixels in that window, using the processor; and
reducing the number of textured pixels in each window of the low-frequency image data by analyzing a corresponding window of the high-frequency image data and weighting the pixels of the window of the low-frequency image data based thereupon, using the processor.

15. A device, comprising:
an image sensor configured to capture image data;
a processor configured to:
receive image data;
separate the image data into high frequency image data and low frequency image data;
separate the high frequency image data into a plurality of windows, with each window containing pixels;
separate the low frequency image data into a plurality of windows corresponding respectively to the plurality of windows of the high frequency image data, with each window containing pixels;
for each window of the plurality thereof in the high frequency image data, using the processor to:
determine a number of textured pixels in the window, the textured pixels being pixels that vary greatly in luminance value with respect to other pixels in the window, and
determine a window modification such that the number of textured pixels in the window is reduced;
for each corresponding window of the plurality thereof in the low frequency image data, using the processor to:
apply the window modification, and
correct each textured pixel in the window based upon the other pixels in the window so as to produce corrected low frequency image data; and
combine the high frequency image data and the corrected low frequency image data to produce corrected image data.

16. The device of claim 15, wherein the processor is configured to apply the window modification by reducing a size of the window such that the number of textured pixels in the window is reduced.

17. The device of claim 15, wherein the processor is configured to apply the window modification by removing at least one textured pixel in the window such that the number of textured pixels in the window is reduced.

18. The device of claim 15, wherein the processor is configured to apply the window modification by generating a plurality of sub-windows inside the window, and removing at least one sub-window such that the number of textured pixels in the remaining sub-windows of the window is reduced.

19. The device of claim 15, wherein the processor is configured to apply the window modification by applying a weight to each pixel in the window, with some weights being zero.

20. The device of claim 15, wherein the processor is configured to correct each textured pixel in the window by setting a pixel value of the textured pixel to an average of each other pixel in the window.

21. The device of claim 15, wherein the processor is configured to determine the window modification based upon the number of textured pixels in the window.

* * * * *